(12) United States Patent
Bailis (10) Patent No.: US 6,443,003 B1
(45) Date of Patent: Sep. 3, 2002

(54) THERMOELECTRIC AIR FLOW SENSOR

(75) Inventor: Robert Thomas Bailis, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/712,468

(22) Filed: Nov. 14, 2000

(51) Int. Cl.⁷ .............................................. G01F 1/68
(52) U.S. Cl. ................................................. 73/204.12
(58) Field of Search ..................... 73/204.12, 202.5, 73/204.14, 204.15, 204.26, 204.22, 204.11

(56) References Cited

U.S. PATENT DOCUMENTS

| | | | |
|---|---|---|---|
| 4,872,339 A | 10/1989 | Gerhard et al. | 73/204.14 |
| 4,911,008 A | 3/1990 | Casey | 73/202.5 |
| 4,938,061 A | 7/1990 | Carp | 73/204.19 |
| 4,976,145 A * | 12/1990 | Kienzle et al. | 73/204.22 |
| 5,186,051 A | 2/1993 | Stecher et al. | 73/204.26 |
| 5,201,221 A | 4/1993 | Forgacs et al. | 73/204.26 |
| 5,212,983 A | 5/1993 | Ott et al. | 73/204.15 |
| 5,237,866 A * | 8/1993 | Nijdam | 73/204.11 |
| 5,237,867 A | 8/1993 | Cook, Jr. | 73/204.15 |
| 5,311,762 A * | 5/1994 | Drexel | 73/3 |
| 5,440,924 A * | 8/1995 | Itsuji et al. | 73/204.25 |
| 5,824,895 A * | 10/1998 | Itsuji et al. | 73/204.17 |

* cited by examiner

Primary Examiner—Benjamin R. Fuller
Assistant Examiner—Jewel I. Thompson
(74) Attorney, Agent, or Firm—James A. Lucas; Driggs, Lucas, Brubaker & Hogg Bo (57) ABSTRACT

A sensor for measuring changes in mass air flow is described that uses one or more thermoelectric devices, each of which serves both as a heating element and as a differential temperature sensor. The thermoelectric device or devices are sandwiched between two surface plates. The sensor operates the device or devices in constant current or in pulsed current mode. The operation in constant current mode involves passing the current through one thermoelectric device to create a temperature differential between the two surfaces. A second thermoelectric device generates a voltage in response to the differential, the voltage being proportional to the air flow rate. In another embodiment, the device contains a single thermoelectric device that operates in a pulsed mode, first to create a temperature differential using an applied current, and then to measure the voltage. When the voltage reaches zero, the cycle is repeated. The cycle time determines the air flow rate. The pulsed mode procedure can be used first to heat one surface during one cycle and then to heat the other surface during the second cycle.

19 Claims, 6 Drawing Sheets

FIG. 4
Pulsed/Sampled Mode

FIG. 5
Alternate Pulsed/Sampled Mode

FIG. 6

THERMOELECTRIC AIR FLOW SENSOR

FIELD OF THE INVENTION

The invention relates to the field of thermoelectric devices and, more particularly, to the use of such a device to measure fluid flow, principally air flow, to control heat build-up in various types of equipment.

BACKGROUND OF THE INVENTION

Air flow sensors are used in numerous industrial and commercial applications to determine mass air flow rates and to protect equipment from overheating. Among these applications are the protection of electronic systems, such as mainframe computers and peripherals, large power supplies, HVAC systems, medical diagnostic and treatment equipment as well as radar systems. Electronic systems include one or more heat generating circuit components. To insure that the heat build-up does not become great enough to damage components or alter their operating characteristics, various techniques are used to facilitate cooling of the systems. One or more fans are commonly used for this purpose. An air flow sensor is placed in the vicinity of the components to detect and respond to changes in air flow, and to generate an alarm signal in the event of a failure of the fan, or a substantial reduction in the air flow volume across the components.

A basic air flow sensor consists of two major components, a heating element and a temperature sensor. The heating element, which usually is a resistor, is thermally coupled to the temperature sensor. The sensor typically is a thermistor which is a semiconductor having a resistance that is very sensitive to temperature changes. When the heating element is energized, the temperature sensor detects a rise in absolute temperature. As air flows across the heating element and the sensor, the absolute temperature rise decreases in proportion to the rate of air flow. Because the temperature sensor measures absolute temperature, it must include means for ambient compensation.

Among the prior art air flow sensors is a thin film, thermally isolated microbridge structure with a heating element positioned between two temperature sensors, comprising an upstream resistor and a downstream resistor. The heating element is heated to a stated temperature, e.g. 160° C., above ambient temperature. As the air flows past the heating element, it picks up heat from the element and warms the downstream resistor while cooling the upstream resistor. The temperature change and the resulting change in resistance of the sensing resistors are proportional to the mass airflow across these resisters. This device suffers the drawback that, in sensitive applications, the sensor can exhibit a chimney effect. If the sensor is mounted in a vertical position under zero flow conditions, the sensor may produce an output that is the result of thermally induced convection current, thereby distorting the readings. Thus, care must be taken to properly mount the sensor in environments where null stability is critical.

Another solid state air flow sensor utilizes a heated thermistor which is part of a sensing bridge that compares its own resistance against a reference circuit. Based on this comparison, the device determines the air velocity at which the device triggers an output. The device has only an on/off output. Furthermore, it requires a temperature compensation which is achieved through use of a diode string.

SUMMARY OF THE INVENTION

It is an object of the present invention to overcome the problems of the prior art thermal sensors. More particularly, it is an object to overcome the chimney effect that can result from the improper positioning of the sensor.

Another object is to overcome the necessity for temperature compensation of the sensor.

Another object is to provide a solid state air flow sensor that uses a thermoelectric device to monitor mass air flow rate in many directions.

Yet another object is the use of a single thermoelectric device in an air flow sensor to both create and sense a temperature differential.

Still another object is an air flow sensor using one component for heating/cooling and for voltage generation, thereby giving improved reliability, simplified manufacture, and flexible interchangeability.

Another object is the use of a temperature differential on either side of ambient.

These and other objects and advantages, which will become self evident, are achieved in the manner to be hereinafter described.

The invention relates to a solid-state air flow sensor comprising at least one thermoelectric device that functions both as a heating element and a sensor of temperature differentials. The thermoelectric device generates a voltage in response to a temperature differential, the voltage being proportional to the difference in temperatures.

In one embodiment, the sensor utilizes one thermoelectric device mounted between the legs of a U-shaped plate. The plate may include heat transfer fins.

In another embodiment, the sensor utilizes two plates and two thermoelectric devices mounted between the plates. Each plate may optionally include a plurality of heat transfer fins.

The invention also relates to a method of sensing changes in the rate of mass air flow. The method involves the use of a solid-state air flow sensor comprising at least one thermoelectric device that functions both as a temperature differential generator and a sensor of temperature differentials. The thermoelectric device generates a voltage in response to the temperature differential, the voltage being proportional to the difference in temperatures.

The method of detecting the air flow utilizing one thermoelectric device includes the steps of a) applying a current pulse to the thermoelectric device for a specific time to create a differential temperature between the plates; b) removing the current; c) monitoring the voltage across the device; and d) measuring the time required for the voltage to reach zero. The sequence is then repeated for a second cycle, wherein steps a–d are duplicated and the time required for the voltage to reach zero for the second cycle is compared with the time required for the first cycle. As an alternative, the polarity of the current pulse can be alternated between cycles, whereby a first surface is heated and a second surface is cooled during one cycle, and the second surface is heated and the first is cooled during the second cycle.

When using two thermoelectric devices between two plates, the method comprises a first cycle including the steps of:

a) applying a current pulse to the first thermoelectric device for a specific time to create a temperature differential between the top and the bottom plates;

b) removing the current;

c) causing a voltage to be generated in the second thermoelectric device proportional to the temperature differential of the plates; and d) measuring the time required for the voltage to return to zero.

DETAILED DESCRIPTION OF THE INVENTION

Unlike a conventional air flow sensor, the thermoelectric air flow sensor of the present invention utilizes one component, a thermoelectric device to both create and to sense a temperature differential. The sensor uses a differential temperature mode to determine the rate of mass air flow. This is unlike the absolute mode that is used in other air flow sensors to make this determination. The sensor has two surfaces, a hot side and a cold side. The hot side temperature will be Δ above the ambient temperature while the cold side temperature will be Δ below ambient temperature. Thus, the temperature differential of the two surfaces will straddle the ambient temperature, thereby reducing or eliminating the need for ambient temperature compensation.

The device can be implemented at a micro level or a macro level. For example, to measure small volumes of air flow, such as in desk top computers, the design can be implemented at an integrated circuit level using PN junctions and micromachining. On the other hand, to measure large volumes of air flow, for example as measured by weather stations, the design may be implemented using discrete pieces of thermoelectric materials.

The device can be designed to run in various modes, several of which will be described in detail as follows.

Figure 1:
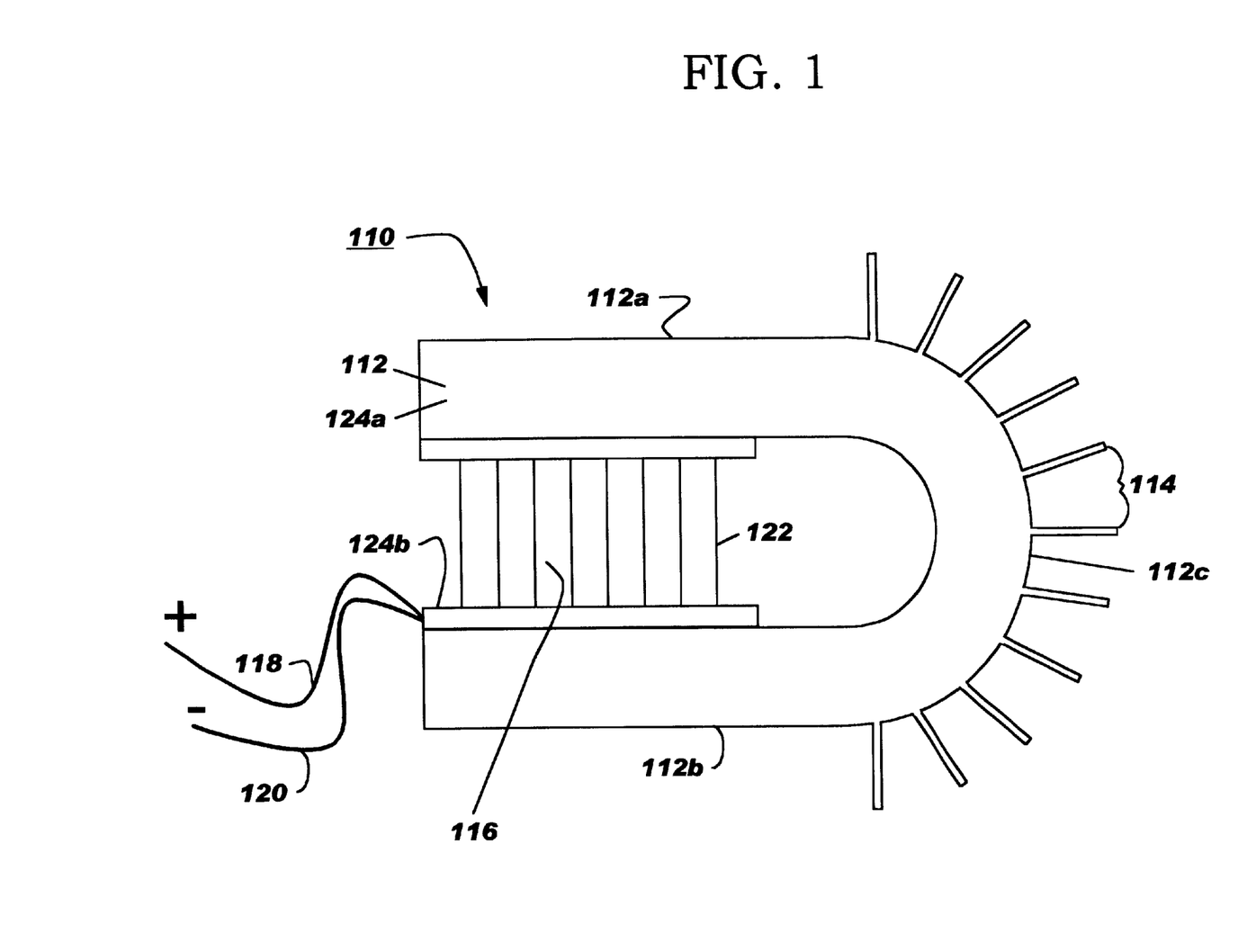
FIG. 1 is a view of one embodiment of the present invention.

FIG. 1 shows a sensor (110) which includes a U-shaped plate (112) having a first planar surface (112a), a second planar surface (112b) and a bight (112c). The plate can be machined or extruded from a metal, such as aluminum. Alternatively, it can be made from copper or from a high thermal conductivity alloy. Yet another approach is to mold the plate from a thermally conductive epoxy or plastic. Disposed along the outside surface of the bight (112c) are a plurality of heat transfer fins (114).

A thermoelectric device (122) is positioned between the two planar surfaces. The thermoelectric device comprises a pair of contact plates (124a, 124b) and thermocouples (116) made of semiconductor material. The contact plates (124a, 124b) are in contact with top plate (112a) and bottom plate (112b), respectively, and are held in position by providing a tight fit between the legs (112a, 112b) of the U-shaped plate, or by use of a thermally conductive adhesive, such as epoxy. Another method for securing the thermocouple between the plates would be to use a doughnut-shaped thermoelectric device and a screw or bolt passing through the top plate and the hole in the thermocouple device into a threaded hole tapped into the bottom plate. The screw or bolt should be made from stainless steel or other low thermal conductive material.

This device uses a single thermoelectric device to create and sense the temperature differential. The device can be operated in a pulsed/sampled mode, whereby a current pulse of a specific duration is applied through leads (118, 120) to the thermoelectric device to create a temperature differential. The current is then removed, and the voltage is monitored across the device. The time is recorded to determine how long it takes for the voltage to reach zero, indicating that both surfaces are at the same temperature. The current pulse is again applied to repeat the cycle. The time required to complete a cycle is proportional to the rate of air flow across the heat exchanger fins. A reduction in the cycle time is indicative of an increase in air flow. This information can be fed to monitors and/or alarms to alert the system or an operator of a possible overheat situation.

The device can also be operated in alternate pulsed/sampled mode. This is similar to the mode described above, except that the polarity of the pulsed current is alternated each cycle. In this manner, each side of the device is alternately heated and cooled while the opposite side is cooled and heated respectively. In this manner, the possibility of drift or chimney effect during periods when there is no air flow is eliminated.

Figure 2:
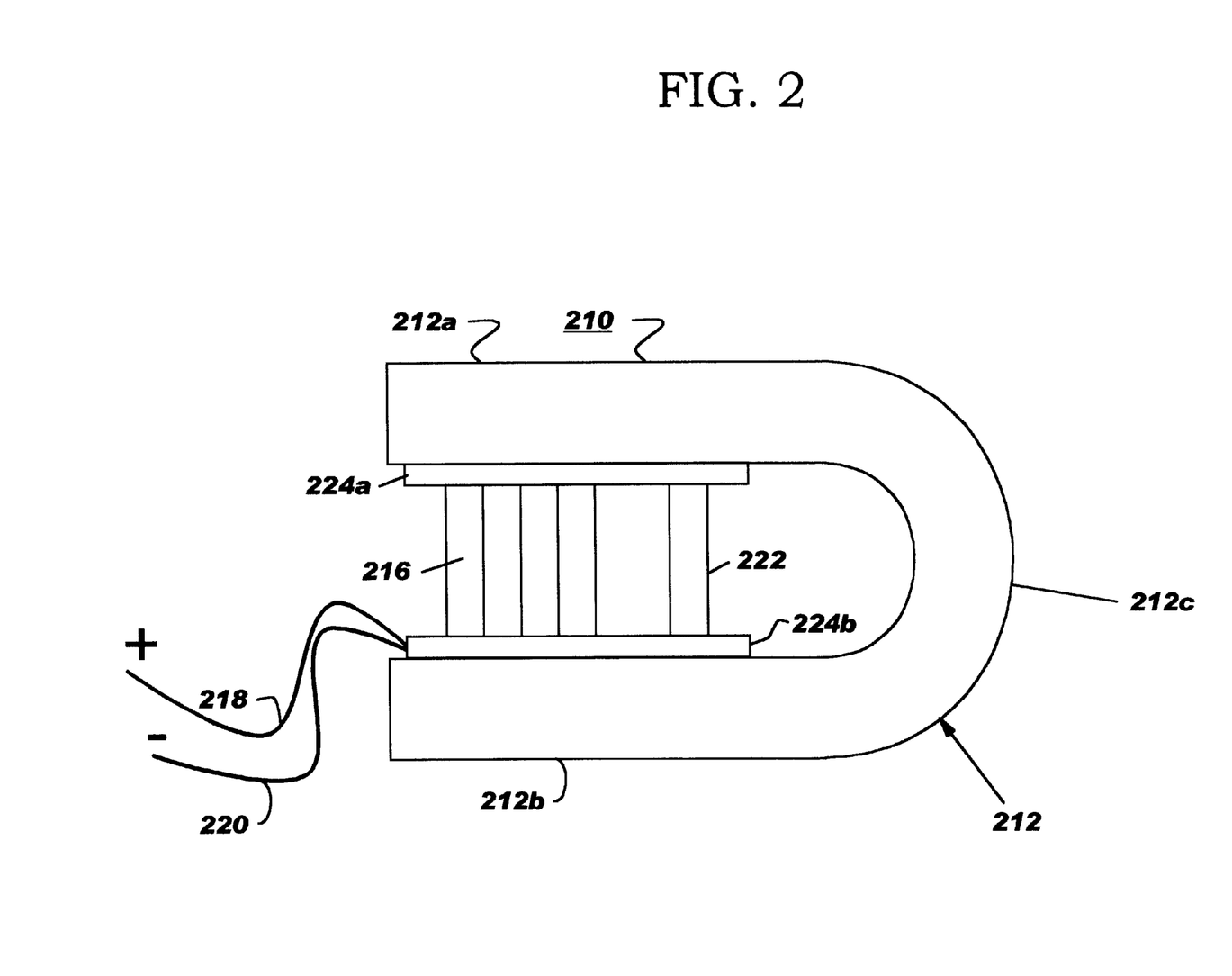
FIG. 2 is a variation of the embodiment.

Turning now to FIG. 2, a sensor (210) is shown comprising a U-shaped plate (212) having a first planar surface (212a), a second planar surface (212b) and a bight (212c). A thermoelectric device (222) is positioned between the two planar surfaces as before. The thermoelectric device comprises a pair of contact plates (224a, 224b) and thermocouples (216) made of semiconductor material. The contact plates (224a, 224b) are in contact with top plate (212a) and bottom plate (212b), respectively. Electric leads (218) and (220) are connected to contact plate (224b). The sensor of this design can be operated in the pulsed/sampled mode or the alternate pulsed/sampled mode in the same way as the sensor shown in FIG. 1. However, the absence of fins serves to eliminate or minimize contamination of sensitive electronic components due to dust and dirt build-up.

The use of the U-shaped or domed plate permits the device to detect air flowing from several different directions.

Figure 3:
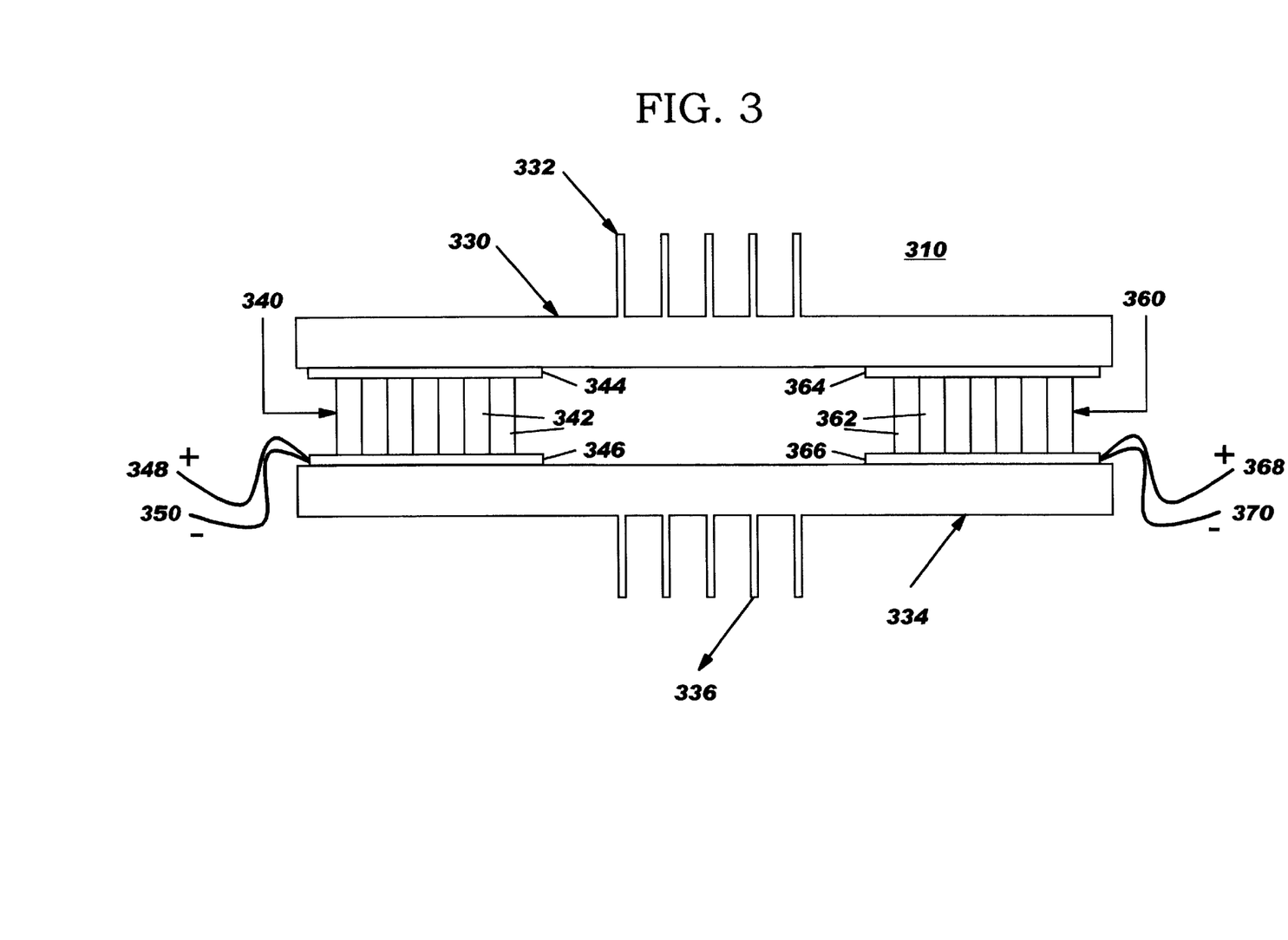
FIG. 3 is another embodiment of the device of the present invention.

Yet another embodiment is shown in FIG. 3, wherein a sensor (310) comprises a top plate (330) which includes heat transfer fins (332) and a bottom plate (334) having heat transfer fins (336). A first thermoelectric device (340) is positioned at one end of the two plates, and a second thermoelectric device (360) is located at the other end between the two plates. The first thermoelectric device (340) comprises a pair of contact plates (344, 346) and thermocouples (342) made of semiconductor material. The second thermoelectric device (360) likewise comprises a pair of contact plates (364, 366) and thermocouples (362) made of semiconductor material. Electrical leads (348, 350) are joined to device (340) and leads (368, 370) are joined to device (360).

This sensor (310) can be operated in a constant current mode or an alternate current mode. When operating in the constant current mode, a current is applied to the first thermoelectric device (340) to create a temperature differential between the top plate (330) and the bottom plate (334). Depending on the polarity of the current, one plate will be heated to a temperature above the ambient temperature, and the other plate will fall below that temperature. The air flows over the heat transfer fins (332, 336). With one plate, the heat is being removed to the air, and with the other plate, the heat is being added to the air, resulting in an attenuation of temperature differential at the second thermoelectric device (362).

The air flow is across the heat exchanger fins (332, 336) and the heat transfer is through the top and bottom plates (330, 334). The temperature of one plate will rise Δ above ambient and the temperature of the other plate will fall Δ below ambient. On the hot side plate, the heat will flow through the plate, left to right toward the second thermoelectric device (362) while, on the cold side, the lack of heat causes a gradient that will flow from left to right to the second thremoelectric device (362). When the heat flows on the hot side plate from left to right and passes through the heat exchanger fins (332), heat will be removed from the plate to the air at a rate proportional to the rate of air flow. When the cooler temperature gradient passes through the heat exchanger fins (336), heat will be added to the plate from the air at a rate proportional to the rate of air flow. The temperature differential seen at the second thermoelectric device will be attenuated as the air flow increases across the heat transfer fins (332, 336). The second thermoelectric device (360) acts as a power generator and produces a voltage that is proportional to the temperature differential. In turn, this is proportional to the rate of air moving across the heat transfer fins. Thus, the air flow rate can be calculated by measuring the voltage across the second thermoelectric device (360). Because the top and bottom plates float on either side of the ambient temperature, the need to compensate the sensor for ambient temperature is reduced or eliminated.

The device (310) can also be programmed to run in alternative current mode. In this manner, a current is applied to the first thermoelectric device (340) to heat one plate above ambient while the other plate is cooled below ambient temperature. The second device (360) acting as a power generator generates a voltage until the differential creates a voltage that is greater than a pre-set threshold voltage. When this voltage is reached, the control circuitry is reversed so that the plate first being heated by the first device (340) is cooled below ambient temperature and the second plate is heated. The total time that it takes to complete the cycle is proportional to the rate of air flow across the heat transfer fins.

Figure 4:
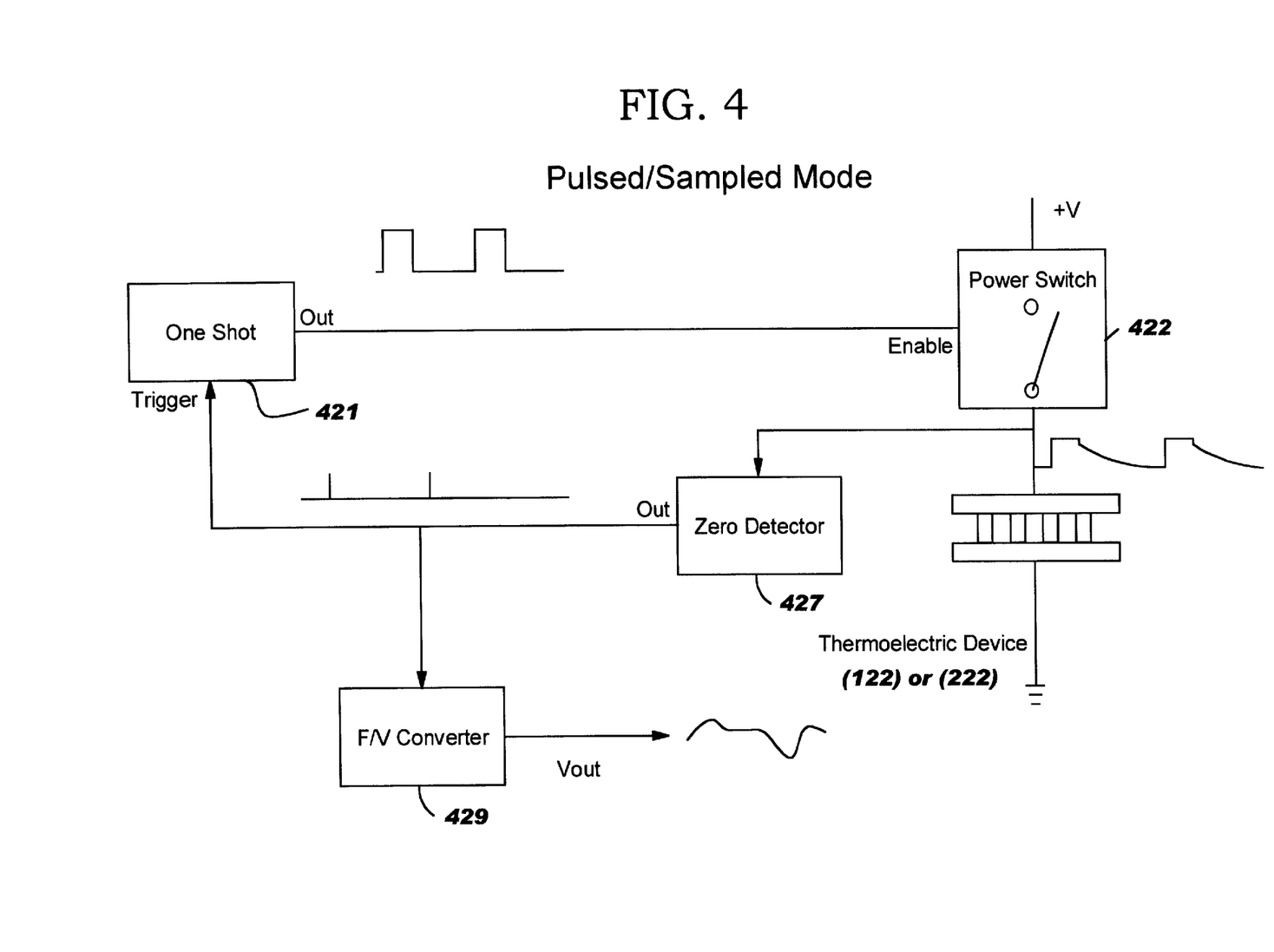
FIG. 4 is a circuit diagram for the embodiment of FIGS. 1 and 2 in the pulsed/sampled mode.
Figure 5:
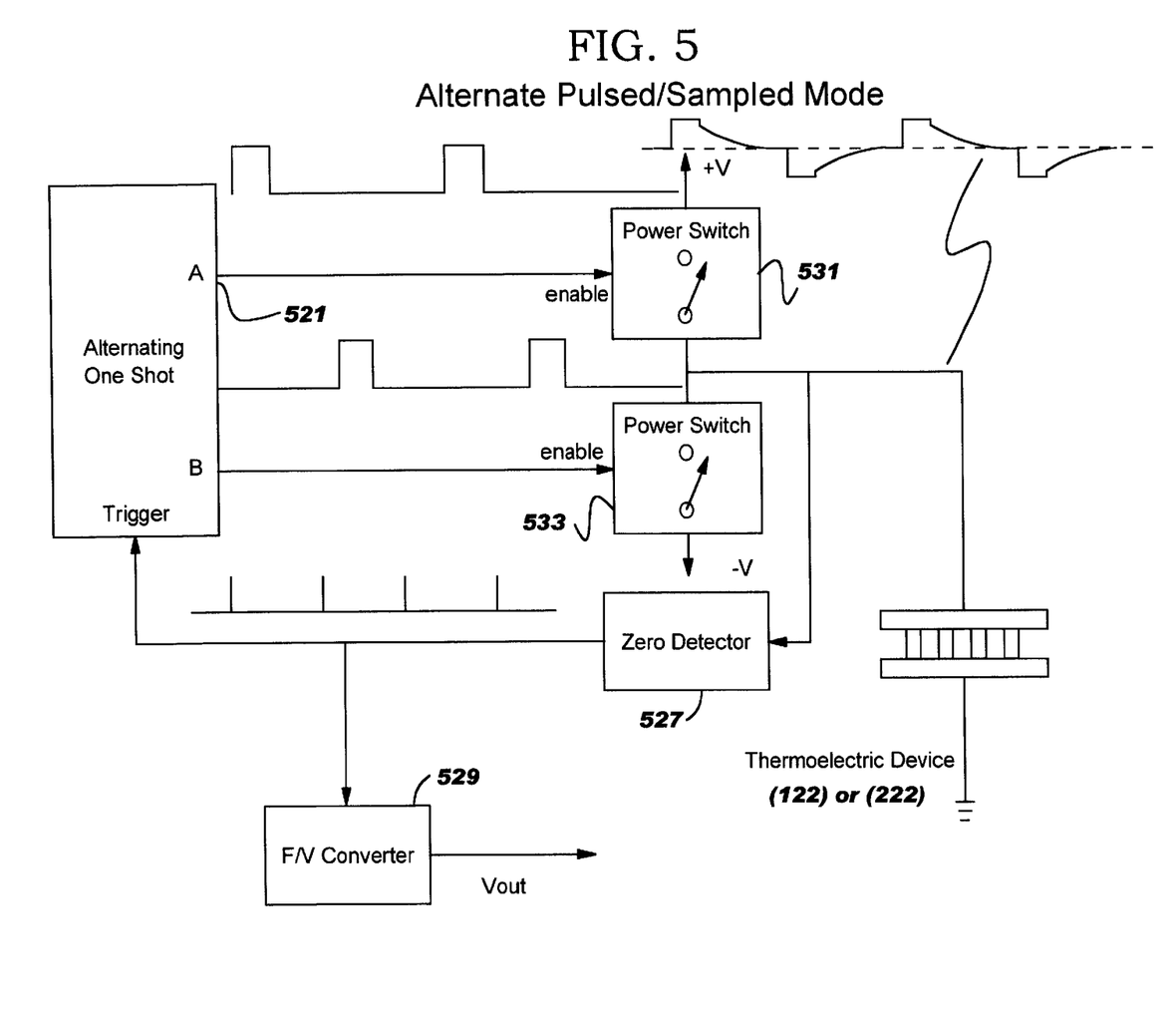
FIG. 5 is a circuit diagram for the embodiment of FIGS. 1 and 2 in the alternate pulsed/sampled mode.
Figure 6:
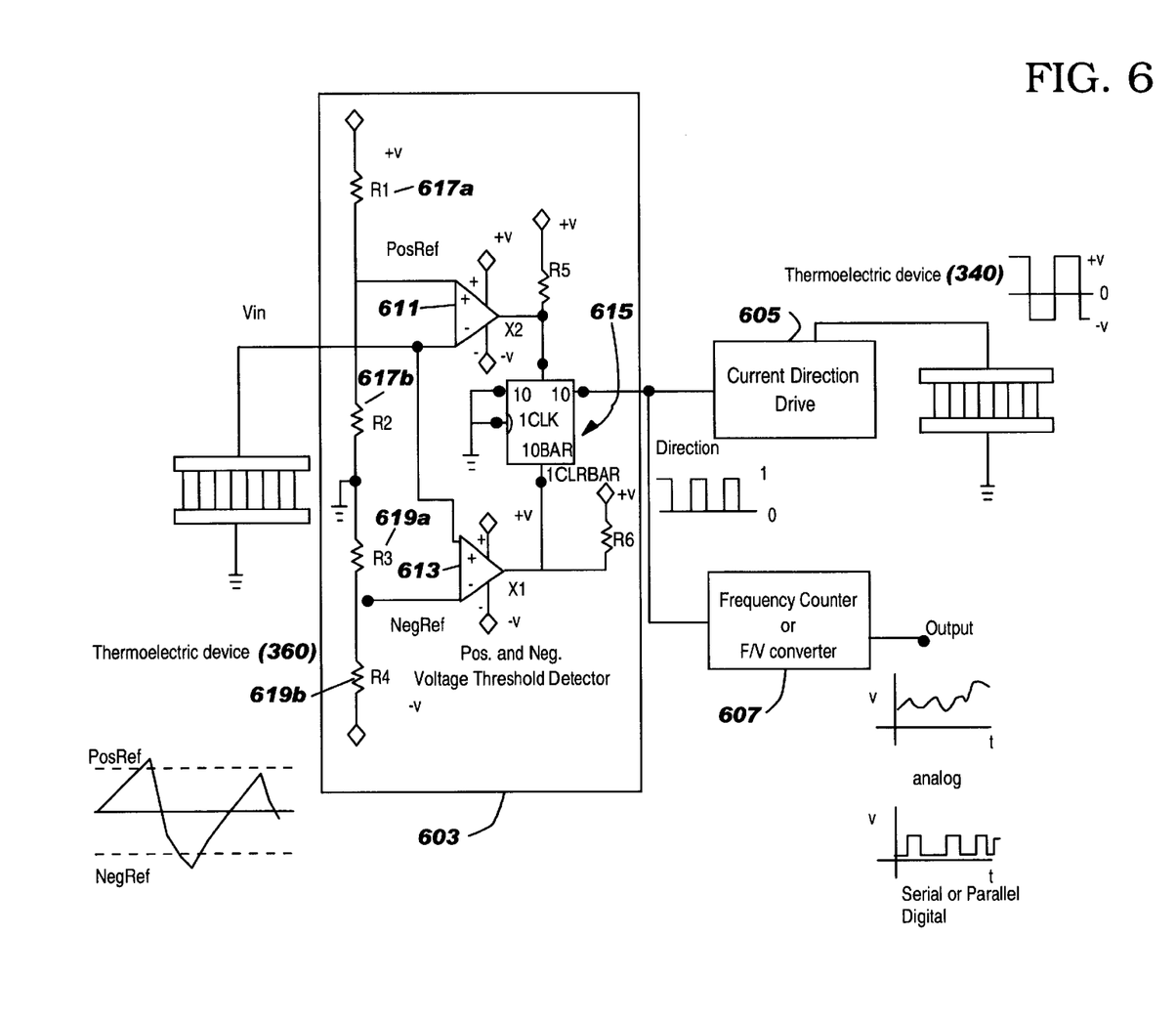
FIG. 6 is a circuit diagram for the embodiment of FIG. 3.

The electrical circuitry that is required to make use of these devices is shown in FIGS. 4, 5 and 6.

Turning first to FIG. 4, the circuitry for the embodiment illustrated in FIGS. 1 and 2 is shown. FIG. 4 represents the operation of the thermoelectric device (122, 222) in the pulsed/sampled mode. A one shot (421) has a trigger input. Upon triggering the one shot, an output of a specific pulse width is fed to the power switch enable (422). A logic "1" will turn on the switch and will supply current to the thermoelectric device (122, 222) for the duration of the pulse width.

Basically, the signal from the one shot (421) is sent to the power switch (422) which could be an FET, a BJT, solid state relay, or like device. The signal from the one shot (421) is a square wave signal that controls the state of the power switch (422). A logic "1" at the enable of the power switch turns it on, and a logic "0" at the enable turns it off, putting it in a high impedance state. When the switch is turned on, a voltage approximately +V is present across the thermoelectric device. The current that flows through the thermoelectric device (122, 222) creates a temperature differential which starts to heat one side of the device (112a or 212a) and to cool the other side (112b, 212b) due to the Peltier effect. When the current is removed by the power switch (422) being turned off, the temperature differential ΔT in the device is still present because of thermal inertia. At that point, the device now becomes a generator due to the Thomson effect, and generates an electromotive force. The high impedance of the power switch in the off state prevents the kinetic energy or EMF, thus generated from leaking back into the +V power supply.

The waveform at the thermoelectric device (122 or 222) shows a sharp rise due to the power switch being turned on, providing a voltage across the device. This is followed by a small downward lip as the power switch is turned off. Because there is a thermal differential across the two surfaces (112a, 112b or 212a, 212b) of the device, the decay shown in the waveform is caused by the EMF generated by the device in its power generating mode. The decay occurs as one surface starts to cool and the other starts to heat up, as the plates seek ambient temperature from either direction. When the two surfaces reach the same temperature (equilibrium), there is no longer any voltage across the device. The decay is a result of the air flowing across the top and bottom surfaces. When the differential reaches zero, this is detected by the zero detector (427) which then sends a signal pulse to the one shot (421), and the one shot commences with another wide pulse to repeat the cycle.

The frequency to voltage converter (429) looks at the pulse train. The more air that is flowing across the thermoelectric device (122, 222), the quicker is the decay and the sooner that the device reaches a zero EMF, resulting in a repeat of a cycle. As a result, the frequency of the pulse train is proportional to the air flow rate. The converter (429) could be a frequency to voltage converter to give a voltage output to be read by a voltmeter or it could be an on/off switch wherein a threshold number of pulses per second would automatically shut the system off, or trigger an alarm, or the like. Thus, the output of the converter could be a digital or an analog output.

Turning now to FIG. 5, this shows a circuitry that can be used for an alternate pulsed/sampled mode. The previous circuitry of FIG. 4 is designed to pass current only in one direction to heat one plate or surface of the thermoelectric device (112 or 212). However, if the thermoelectric device of the present invention is placed within a mechanical closure, the closure itself may have a certain amount of residual thermal inertia. FIG. 5 shows a power switch enable (531) on the positive voltage and a similar enable (533) on the negative voltage. This enable can be a transistor, an H-bridge or an FET or other similar device. If there is a single voltage source, then an H-bridge would be appropriate. If dual voltage sources are used to supply positive and negative voltages, then an arrangement, such as two transistors in a totem pole configuration, would be appropriate.

The alternating one shot power source (521) can be implemented in a number of ways. Typically, a first trigger would pulse the output 'A' of the alternating one shot (521) which turns on the positive power switch (531). The next sequential trigger would pulse the output 'B' which turns on the negative power switch (533). This would provide a positive voltage to be present across the thermoelectric device (122 or 222) during the pulse of the "A" output and would provide a negative voltage to be present across the thermoelectric device during the pulse of the "B" output. FIG. 4 shows a voltage waveform across the thermoelectric device (122 or 222) due to the equilibrium to a positive temperature differential. On the other hand, FIG. 5 shows a voltage waveform across the device due to the temperature across the plates (122a, 112b or 212a or 212b) at a positive temperature differential to equilibrium to a negative temperature differential to equilibrium and then repeat. This arrangement constantly alternates the temperature of the two plates so that first plate A is heated by the first cycle and then plate B is heated on the next cycle. As explained in connection with FIG. 4, the zero detector (527) and the frequency to voltage converter (529) function as before.

A circuit for the embodiment shown in FIG. 3 can be seen in FIG. 6. It consists of three major parts:
1. A positive and negative voltage threshold detector (603),
2. A current direction driver (605), and
3. A frequency counter or frequency to voltage converter (607).

The voltage threshold detector (603) consists of two voltage comparators (611, 613) and a flip flop (615) with set and reset inputs. The top comparator detects the positive voltage and the bottom comparator detects the negative voltage. Resistors R1 and R2 (617a, 617b) set the threshold level for the positive voltage and resistors R3 and R4 (619a, 619b) set the threshold for the negative voltage. When the voltage in (Vin) is greater than the positive threshold (PosRef), then the top comparator will output a low and will set the flip flop. When the voltage is between the PosRef and the NegRef, the output of both comparators will be high and the flip flop will remain in its current state. When Vin falls below the NegRef, then the lower comparator will output a low, and the flip flop will be reset. The output of the flip flop connects to the current direction driver.

The current direction driver (605) controls the direction of the current to the thermoelectric device. This circuit supplies current to the thermoelectric device in the direction depending on the signal from the positive and negative voltage threshold detector. A logic 1 produces a positive current to the thermoelectric device and logic 0 produces a negative current to the thermoelectric device. This circuit can be a power op amp, or discrete transistors in a totem pole or H-bridge configuration.

The frequency counter or frequency to voltage converter (607) monitors the direction signal. The direction signal toggles at a rate that is inversely proportional to the rate of air flow. By counting the toggles, a useful measurement can be made. This measurement can then be converted to an analog output or a digital output signal.

The device of the present invention can be used in a number of different modes. It can respond to changes in air flow to generate a signal indicative thereof for use by a separate utility circuit which might sound an alarm and/or turn off a system, such as an electronic system with heat generating circuit components. The device can be used with a fail safe output wherein the alarm is always on during the safe flow of air and shuts the device off at insufficient air flow levels. Conversely, the device can be used with the alarm off unless and until the air flow becomes inadequate, whereupon the alarm is activated, or the device shuts the system down or takes other remedial action.

The details of thermoelectric devices and individual components of the circuitry are known to persons of ordinary skill in the art and do not comprise a part of the present invention, with the exception of the specific structural and operating parameters that are uniquely oriented to the present invention.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed is:

1. A solid-state air flow sensor to monitor mass air flow in different directions comprising at least one thermoelectric device that functions both as a temperate differential generator and a sensor of temperature differentials, the thermoelectic device comprising first and second contact plates separated from one another by semiconductive thermocouples, said device including means for generating a temperature differential between the contact plates when a current pulse is applied to one of the plates and means for generating a voltage in response to a temperate differential, the voltage being proportional to the difference in temperatures.

2. The sensor according to claim 1 wherein the sensor utilizes one thermoelectric device, and said device is mounted between the legs of a U-shaped plate.

3. The sensor according to claim 2 wherein the plate includes a plurality of heat transfer fins.

4. The sensor according to claim 2 further including:
   a) a trigger for applying a current pulse the thermoelectric device for a specific time to create heat in one plate and to draw heat from the other plate;
   b) means to remove the flow of current;
   c) a zero detector for monitoring the voltage generated across the device as a result of the temperature differential; and
   d) a timer for measuring the time required for the voltage to reach zero.

5. The sensor according to claim 1 utilizing two plates, and two thermoelectric devices mounted between the plates.

6. The sensor according to claim 5 wherein each plate includes a plurality of heat transfer fins.

7. The sensor according to claim 5 further including
   a) a trigger for applying a current pulse to the first thermoelectric device for a specific time to create a temperature differential between the top and the bottom plates;
   b) means for removing the current;
   c) a detector for monitoring the voltage generated in the second thermoelectric device proportional to the temperature differential of the air passing over the device; and
   d) a timer for measuring the time required for the voltage to return to zero.

8. The sensor according to claim 5 further including a positive and negative voltage threshold detector, a current direction driver
   and a signal direction monitor.

9. A method of sensing changes in the rate of mass air flow comprising the use of a solid-state air flow sensor utilizing at least one thermoelectric device comprising the steps of operating the device as a temperature differential generator and as a sensor of the temperature differential.

10. The method according to claim 9 including the step of generating a voltage in response to the temperate differential, the voltage being proportional to the difference in temperatures.

11. The method according to claim 9 including the step of mounting one thermoelectric device between the legs of a U-shaped plate.

12. The method according to claim 11 comprising the step of including a plurality of heat transfer fins.

13. The method according to claim 12 comprising the step of utilizing two plates, a top plate and a bottom plate, and two thermoelectric devices mounted between the plates.

14. The method according to claim 13 comprising the step of including a plurality of heat transfer fins to each plate.

15. The method according to claim 11 including a first cycle involving the steps of:
   a) applying a current pulse to the thermoelectric device for a specific time to create heat in one plate and to draw heat from the other plate;

b) removing the current flow;

c) monitoring the voltage generated across the device as a result of the temperature differential; and d) measuring the time required for the voltage to reach zero.

16. The method of claim 15 including the further step of including a second cycle wherein steps a–d are reed and the time required for the voltage to reach zero for the second cycle is compared with the time required for the first cycle.

17. The method according to claim 16 including the step of alternating the polarity of the current pulse between cycles.

18. The method according to claim 13 comprising a first cycle including the steps of:

a) applying a current pulse to the first thermoelectric device for a specific time to create a temperature differential between the top and the bottom plates;

b) removing the current;

c) monitoring the voltage generated in the second thermoelectric device proportional to the temperature differential of the air passing over the device; and d) measuring the time required for the voltage to return to zero.

19. A method of sensing changes in the rate of mass air flow comprising the use of a solid-state air flow sensor utilizing at least one thermoelectric device mounted between two contact plates, comprising operating the device as a temperature differential generator and as a sensor of the temperature differential including the steps of:

a) applying a current pulse to the thermoelectric device for a specific time to create heat in a first plate and to draw heat from a second plate;

b) removing the current flow;

c) monitoring the voltage generated across the device as a result of the temperature differential;

d) measuring the time required for the voltage to reach zero;

e) reversing the polarity of the current pulse so as to create heat in the second plate and to draw heat from the first plate; and f) repeating steps b, c and d.

* * * * *